Aug. 26, 1969 N. A. NELSON ET AL 3,463,449
PLUG FOR SPHERICAL PLUG VALVE
Filed June 7, 1967 2 Sheets-Sheet 1

INVENTORS
NORMAN A. NELSON
HENRY C. TOOLEY
BARNEY A. EILERS
JOHN HELENBERG
BY
AGENT

Aug. 26, 1969    N. A. NELSON ET AL    3,463,449
PLUG FOR SPHERICAL PLUG VALVE
Filed June 7, 1967    2 Sheets-Sheet 2

INVENTORS
NORMAN A. NELSON
HENRY C. TOOLEY
BARNEY A. EILERS
JOHN HELENBERG

BY *James E. Jackson*
AGENT

United States Patent Office 3,463,449
Patented Aug. 26, 1969

3,463,449
PLUG FOR SPHERICAL PLUG VALVE
Norman A. Nelson, Henry C. Tooley, and Barney A. Eilers, Houston, and John Helenberg, La Porte, Tex., assignors to ACF Industries, Incorporated, New York, N.Y., a corporation of New Jersey
Filed June 7, 1967, Ser. No. 644,269
Int. Cl. F16k 5/20, 15/04, 5/06
U.S. Cl. 251—309       2 Claims

ABSTRACT OF THE DISCLOSURE

A fabricated plug valve comprising a relatively thin generally spherical outer shell and having its interior formed by a mass of structural material disposed within the generally spherical shell which is of sufficient strength to support the shell against deflection or collapse by fluid under pressure which is controlled by the valve.

Background and description of the invention

This invention relates generally to valves and more specifically to spherical plug valves particularly of the larger variety which are employed for controlling the flow of fluid in pipelines and other large flow systems. The invention, however, is not intended as being limited to large valve structures since the invention is applicable to employment in spherical plug valves of all sizes.

In the manufacture of large spherical plug valves, which are frequently referred to in the industry as "ball valves," the generally spherical rotatable plug member is generally manufactured either from a casting or from a generally cylindrically-shaped forging. Both of these methods of plug manufacture have severe manufacturing limitations which tend to affect the cost of the product although the quality of cast and forged spherical plugs are equally acceptable for the manufacture of valves. Casting spherical plug members generally lends itself to the production of more accurately and intricately shaped structures requiring a minimum of machining, but the possibility of surface imperfections which might be created by the casting process can result in an undesirable scrap rate, which tends to maintain production costs at a high level. It is imperative that the spherical sealing surface of the plug be free from pores or other surface imperfections. Sound metal structure, which is necessary for the formation of plug structures of this nature, can generally be produced more readily by forging rather than casting because a large amount of metal is provided by the forging process from which the spherical plug can be machined. The use of large forgings is also considered generally impractical because of the costs involved in the manufacturing process, primarily because of the amount of metal which must be removed and the difficulty in producing extremely large forgings. The forgings from which the plugs are produced cannot be formed to an accurate spherical shape by the forging process and, therefore, a very large amount of metal must frequently be machined therefrom in order to generate a spherical surface of the required size. For example, it has been found that to machine a forging to form a spherical plug thirty (30) inches in bore diameter, approximately 700 to 900 pounds of metal frequently must be removed. Machining of such a large amount of material from forgings result in high manufacturing costs, thereby reducing the competitiveness of the product.

Another consideration which generally renders pipeline ball valves uncompetitive in the pipeline industry concerns the higher cost of large ball valves as compared to the cost of gate valves. The more expensive nature of pipeline ball valves is enhanced by the cost of the spherical plug member as compared to the gate member of gate valves. This is due in part to the higher cost of machining the spherical sealing surface on the plug as compared to machining the flat surface on the gate member and also is due to the much greater weight of the spherical plug as compared to the gate of gate valves. Where special expensive alloy materials are required for valve parts because of the design of the valve for particular service conditions, the cost of the spherical plug member becomes even more critical due to the greater volume of material required for the manufacture thereof as compared to the gate of gate valves.

Another factor of manufacturing importance concerns the problem of supporting the plug member within the valve body. Due to the extremely heavy nature of large plug members, it is necessary to provide plug supporting structures of considerable massiveness and strength to provide proper support and to allow proper rotation of the plug member within the valve body. The cost of spherical plug valves is enhanced by trunnion and bearing structures which are capable of supporting the weight of such extremely heavy solid valve plugs. Operating torques which are required to impart rotation to the plug member serve as a further disadvantage because they are generally high primarily as a result of the weight of the plug member.

Summary

The instant invention therefore is directed to the manufacture of a spherical plug member incorporating an outer shell of generally spherical shape and having material disposed within the outer shell capable of providing structural support to prevent collapsing of the shell by fluid pressures which might be exerted thereagainst. The material filling the outer shell may be metallic in nature or it may be composed of a combination of various acceptable substances which serve both as a force transmitting filler for the cavity defined by the outer shell and also as adequate structural support for the outer shell.

Accordingly, it is a primary object of the instant invention to provide a novel generally spherical plug construction utilizing a preformed outer shell and incorporating the advantages of casting for the internal portion of the spherical plug.

It is a further object of this invention to provide a novel generally spherical plug construction which insures the provision of a defect-free outer surface for low cost machinability and also assures sufficient internal strength to adequately carry pressure loads to which the plug structure will be subjected.

An even further object of the invention contemplates the provision of a novel generally spherical plug structure which is inexpensive in nature and reliable in use.

Other and further objects of this invention will become obvious upon an understanding of the illustrative embodiments about to be described or will be indicated in the appended claims, and various advantages not referred to herein will occur to one skilled in the art upon employment of the invention in practice.

Preferred embodiments of the invention have been chosen for purposes of illustration and description and are shown in the accompanying drawings forming a part of this specification wherein.

Figure 1:
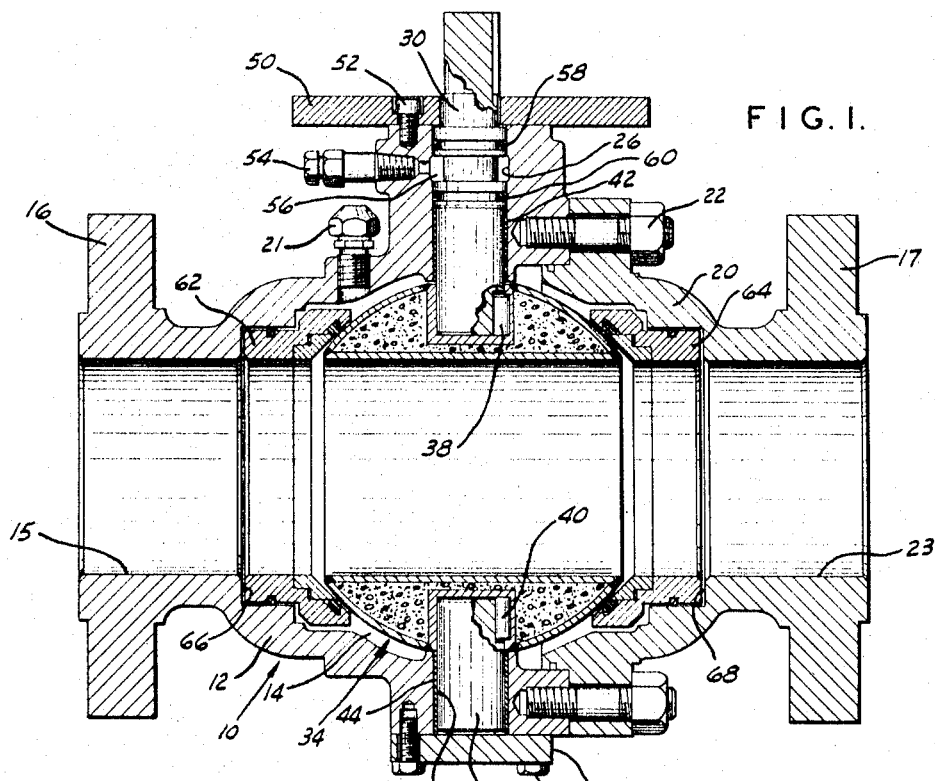
FIGURE 1 is an elevational view in section illustrating a generally spherical plug valve constructed in accordance with the spirit and scope of this invention.

Referring now to the drawings for a more complete understanding of the invention, a valve which may be an end entry spherical plug valve as illustrated at 10 in FIGURE 1 has a valve body portion 12 thereof defining a valve chamber 14. The valve body portion 12 of the valve 10 is formed with a flow passage 15 in fluid communication with the valve chamber 14. The valve body may be provided wtih a flange structure shown at 16 in FIGURE 1, or it may be provided with a weld end construction for either bolted or welded connection of the valve 10 to a pipeline or other conduit structure. Other conventional methods of connection between the valve 10 and a pipeline such as threaded connection, for example, may be employed without departing from the spirit or scope of this invention. An end closure portion 20 of the valve 10 is retained in sealed assembly with the valve body portion 12 by a series of bolts or threaded studs 22 and defines a closure for the valve chamber. The enclosure member 20 is formed with a flow passage 23 which is disposed in axial alignment with the flow passage 15. The end closure member 20 may be provided with a flanged structure 17 for bolted connection thereof to a pipeline 18 or other suitable connection structure may be employed within the spirit or scope of this invention. The valve body 12 may be provided with a pressure relief fitting 21 for bleeding body pressure to the atmosphere if desired.

The valve body 12 is formed with upper and lower aligned bores 26 and 28, respectively, which receive upper and lower trunnion members 30 and 32 respectively therein. A generally spherical plug member 34, forming an important part of this invention, and which will be discussed in detail hereinbelow, is provided with upper and lower trunnion apertures 35 and 36, respectively, which receive the upper and lower trunnions 30 and 32 to maintain alignment of the spherical plug within the valve body. Upper and lower key members 38 and 40 are retained within interrelated slot structures formed within the plug members and trunnion members to provide nonrotatable connection between the trunnion and the spherical plug. Bearing members 42 and 44 are interposed between the trunnion members and the respective cylindrical trunnion bores in the valve body. A cover plate 46 which provides a closure and support plate for the trunnion aperture 28 is fixed to the valve body 12 by a series of bolts 48. An operator adapter plate 50 is connected by a series of cap screws 52 to the upper extremity of the valve body about the upper trunnion bore 26. The upper trunnion or stem 30 extends through an aperture formed in the adapter plate. Any one of a number of commercially available power or manually actuated devices may be fixed to the adapter plate 50 in any desirable manner to provide mechanical means for imparting rotation to the upper trunnion member 30, and thereby to rotate the spherical plug member between the open and closed positions thereof.

For establishing a seal between the upper trunnion or stem 30 and the valve body 12 by threading or the like.

The packing adapter is utilized to force semisolid packing material into an annular packing chamber 56 defined about the valve stem 30. A pair of sealing members 58 and 60 are disposed on opposite sides of the packing chamber 56 and serve to prevent escape of the packing material from the packing chamber through the stem aperture 26.

To establish a seal between the rotatable spherical plug member 34 and the valve body, a pair of annular seat assemblies 62 and 64 are retained respectively within annular seat pockets 66 and 68 formed about the flow passages 15 and 23.

Figure 2:
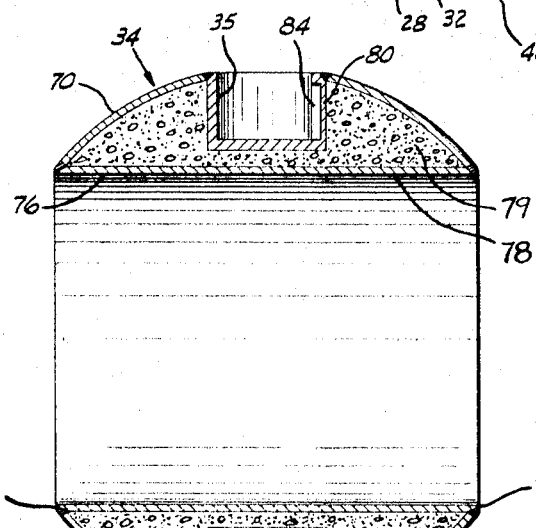
FIGURE 2 is a sectional view of the plug member of FIGURE 1 disassembled from the valve.

With reference to FIGURE 2, which illustrates the plug member 34 in detail, the plug member comprises a relatively thin shell 70 of generally spherical shape and defining circular openings 72 and 74. A tubular member 76 is disposed within the generally spherical shell and is connected thereto about the circular openings 72 and 74 by welding or the like. The tubular member 76 defines a flow passage 78 which, in the open position of the valve, is aligned with the flow passages 15 and 23.

The spherical shell 70 and the tubular member 76 cooperate to define an annular chamber 79 which is filled with relatively rigid material giving structural support to the spherical shell 70 to prevent collapsing thereof by fluid pressures applied to the exterior of the spherical shell by fluid controlled by the valve. This material may be any one of a number of suitable materials which can be poured in a substantially liquid or otherwise pourable form into the spherical shell and which subsequently harden into a relatively rigid mass capable of preventing collapse of the shell by fluid pressure. For example, various materials such as acceptable plastics, concrete, oil well cement, aluminum and other suitable pourable materials may be effectively utilized within the spirit and scope of this invention. Various light weight materials, such as sintered metal, plaster of paris and various porous structural materials, such as syntactic foams referred to in the industry as cellular mortar, may also be utilized to fill the cavity 79. To provide proper support for the plug member 34 within the valve body, trunnion support elements 80 and 82 are connected to the spherical shell 70 by means of welding or the like. The trunnion support elements may be welded to the shell 70 either prior to or subsequent to filling the shell with structural material as desired. Where the filling operation is to occur prior to attachment of the trunnion support elements to the shell 70, one or more of the openings in the shell for the trunnion support elements may be utilized for the filling operation. Filling apertures may be formed in the shell to be closed subsequent to the filling operation if it is desired to connect the trunnion support elements to the shell prior to the filling operation. These methods of manufacture are set forth merely for purpose of explanation and are not intended as limiting this invention as other obvious methods may be employed within the spirit and scope thereof. The trunnion support elements are internally bored to receive the upper and lower trunnions 30 and 32 respectively therein. The upper trunnion support element is provided with a key slot 84 which receives the key 38 to provide nonrotatable connection between the upper trunnion or stem 30 and the spherical plug 34 as described hereinabove.

Figure 3:
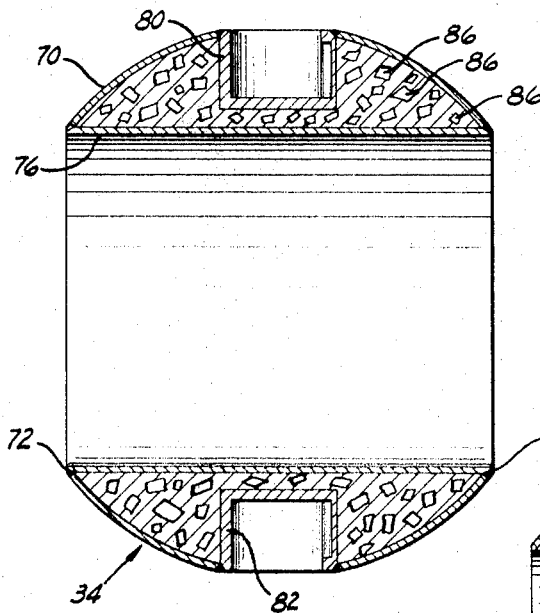
FIGURES 3-5 are sectional views of spherical plugs manufactured in accordance with modified embodiments of this invention.

Referring now to FIGURE 3, a modified embodiment of the invention is illustrated which incorporates a generally spherical outershell 70, a tubular member 76 and opposed trunnion members 80 and 82 of similar construction as described above with reference to FIGURE 2. Light weight solid objects 86, such as firebricks, ceramic balls or other desirable objects are disposed within the annular chamber defined between the tubular member 76 and the spherical shell 70. These materials interfit to form a network of voids within the annular chamber 79. Subsequent to placement of the solid objects within the annular cavity, a substantially liquid or other pourable substance is placed within the annular cavity to fill the voids between the solid objects. The liquid substance, such as oil well cement, cast iron, aluminum, etc., will subsequently harden and will thereby cooperate with the solid objects to provide a relatively light weight structure having sufficient structural integrity to adequately support the spherical shell 70 against the loads applied thereto by fluid pressure. The invention is not intended to be limited to an internal core formed of a pourable hardening substance. The spirit and scope of this invention includes the use of any material which may be disposed within the plug chamber and which will be subsequently formed into a structural mass. For example, sintered metal may be placed within the spherical plug and through a sintering procedure will be formed into an integrated structural mass giving structural support both in compression and in tension.

Figure 4:
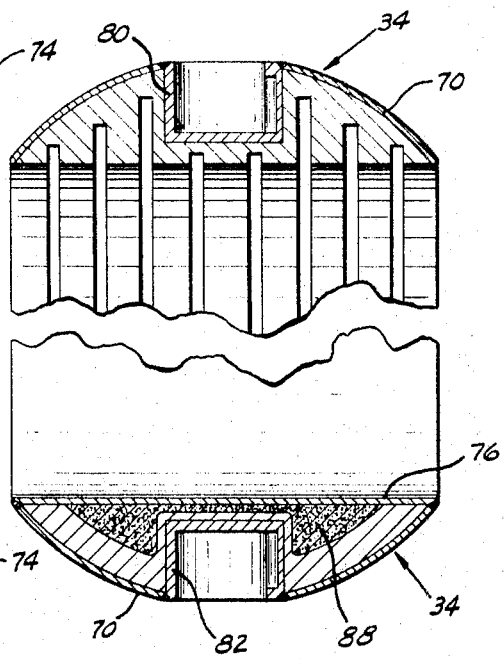

The upper portion of FIGURE 4 discloses a modified embodiment of this invention which employs the principle of coring to achieve a relatively light weight and yet structurally strong internal support structure for the spherical shell. The spherical shell 70 is fabricated about a core member such as a baked sand core, sintered metal core, or the like and then a substantially liquid or pourable substance such as cast iron aluminum, concrete, etc., is placed within the annular chamber defined between the core member and the spherical shell, and is allowed to harden. Subsequent to hardening of the liquid substance the internal core may be removed, thereby achieving an internal structure essentially as illustrated in the uppermost portion of FIGURE 4.

A further modified embodiment of this invention is illustrated in the lower portion of FIGURE 4 comprising a generally spherical shell 70 and a tubular member 76 essentially as described above in regard to FIGURES 2 and 3. In the manufacture of this embodiment a sand core 88 or other suitable coring material is disposed about the tube 76 prior to fabrication of the spherical shell 70 to the tubular member 76. The core 88 has a generally spherical outer configuration and is disposed in generally concentric relation to the spherical shell 70, thereby defining a generally spherical chamber therebetween. A liquid or otherwise pourable substance, as described hereinabove, is disposed within the generally spherical chamber and is allowed to harden, thereby forming an internal structural shell within the outer shell which is of sufficient structural integrity to adequately carry fluid loads applied to the spherical surface of the plug member. The core member 88 will be left in place within the spherical plug.

Figure 5:
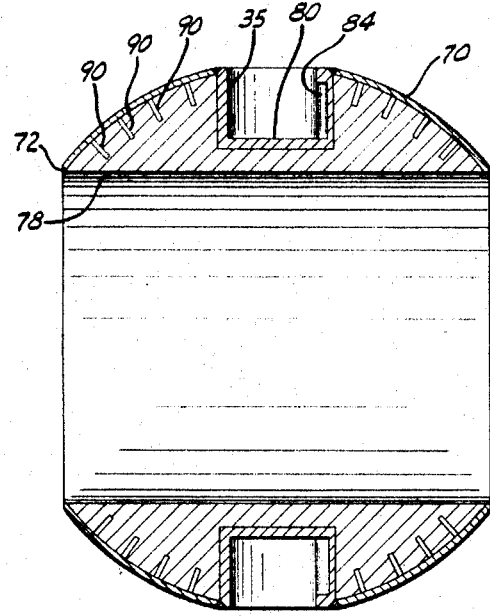

Referring now to FIGURE 5, a further modified embodiment of the invention is illustrated which incorporates a generally spherical shell 70 and trunnioned element 80 essentially as described above in regard to FIGURES 2 and 3. Structural elements 90 are fixed to the internal surface of the spherical shell 70 by welding or in any other desired manner. A core member which may be a cylindrical sand core of the diameter of the openings 72 and 74 is then placed within the spherical shell through the circular openings 72 and 74 in such manner as to define an annular chamber with the spherical shell. A quantity of substantially liquid material such as cast iron, aluminum, concrete, plastic or the like, is subsequently placed within the annular chamber and allowed to harden and the cylindrical core member is removed. The pin members 90 establish sufficient structural interrelation between the spherical shell 70 and the internal filler material to maintain proper positioning of the filler mass within the spherical shell. The filler mass defines the internal passage 78 of the plug 34.

Subsequent to formation of the spherical plug member 34 by either of the methods described above in regard to FIGURES 2, 3, 4 and 5, the plug member is subjected to slight machining removing a minimum of material and forming an accurate spherical sealing surface. The sealing surface is subsequently treated to provide proper surface tolerances to achieve optimum sealing ability.

It will be evident from the foregoing that we have provided a unique spherical plug construction which is of an inexpensive nature and which requires a minimum of surface finishing to provide a spherical plug which is ready for use. The removal of a much smaller amount of material by machining, as compared to the machining of castings or forgings as described above, results in a spherical plug construction of lower cast, thereby promoting the competitiveness of the valve. The outer spherical shell of the plug, the tubular conduit and the trunnion support elements thereof may be manufactured of high cost noncorrosive materials for use in special corrosive service conditions and the internal portion of the spherical plug may be formed of inexpensive materials without sacrificing quality or serviceability of the product and yet the product will retain a competitive nature. A spherical plug constructed in accordance with either of the species of the invention set forth in FIGURES 2 through 5 will be of sufficient internal strength to provide adequate support for line loads to be applied thereto, threeby providing a structure which is low in cost and reliable in use. Therefore, it is evident that this invention is one well adapted to obtain all of the objects hereinabove set forth together with other advantages which will become obvious and inherent from a description of the apparatus itself.

We claim:

1. A generally spherical plug member for a spherical plug valve comprising a relatively thin outer spherical shell, a tubular conduit member extending through said spherical shell and defining a cavity therewith, said tubular conduit being connected at each extremity thereof to said spherical shell and defining a flow passage through said plug member, a pair of opposed trunnion support members fixed to said spherical shell and depending into said cavity, a lightweight core member disposed about said tubular conduit, a core member having structural integrity formed within said cavity between said lightweight core member and the spherical shell.

2. A generally spherical plug member for a spherical plug valve comprising a relatively thin outer shell of generally spherical configuration and having inlet and outlet openings therein, a pair of trunnion support members being fixed to said outer shell and extending into said plug member, a plurality of structural anchor elements being fixed to the inner surface of said outer shell, a core of material having structural integrity disposed within said plug member and being formed about said trunnion support members and said structural anchor elements whereby said core will be retained in substantially integral immovable relation with said outer shell, a flow passage defined in said core in registry with said inlet and outlet openings.

References Cited

UNITED STATES PATENTS

| 1,653,202 | 12/1927 | Bubla | 137—375 X |
| 2,071,391 | 2/1937 | Crowell | 137—375 X |
| 3,367,359 | 2/1968 | Johnson | 137—375 |

FOREIGN PATENTS

| 407,010 | 2/1934 | Great Britain. |
| 639,336 | 6/1950 | Great Britain. |

M. CARY NELSON, Primary Examiner

MICHAEL O. STURM, Assistant Examiner

PO-1050
(5/69)

UNITED STATES PATENT OFFICE
CERTIFICATE OF CORRECTION

Patent No. 3,463,449            Dated August 26, 1969

Inventor(s) Norman A. Nelson, Henry C. Tooley, Barney A. Eilers, John Helenberg

It is certified that error appears in the above-identified patent and that said Letters Patent are hereby corrected as shown below:

Column 1, line 62, after "plug" insert -- of --

Column 3, line 54, after "12" insert -- , a stem packing adapter 54 is connected to the valve body 12 --

Column 6, line 3, "cast" should read -- cost --; line 16, "threeby" should read -- thereby --

Signed and sealed this 8th day of June 1971.

(SEAL)
Attest:

EDWARD M. FLETCHER, JR.            WILLIAM E. SCHUYLER, JR.
Attesting Officer                    Commissioner of Patents